United States Patent
Mehra et al.

(10) Patent No.: US 11,740,944 B2
(45) Date of Patent: Aug. 29, 2023

(54) METHOD AND APPARATUS FOR MANAGING PROCESSOR FUNCTIONALITY

(71) Applicants: Advanced Micro Devices, Inc., Santa Clara, CA (US); ATI Technologies ULC, Markham (CA)

(72) Inventors: Amitabh Mehra, Fort Collins, CO (US); Anil Harwani, Austin, TX (US); William Robert Alverson, Austin, TX (US); Jerry Anton Ahrens, Jr., Austin, TX (US); Charles Sum Yuen Lee, Richmond Hill (CA); John William Abshier, Austin, TX (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/711,875

(22) Filed: Dec. 12, 2019

(65) Prior Publication Data

US 2021/0182121 A1 Jun. 17, 2021

(51) Int. Cl.
*G06F 1/324* (2019.01)
*G06F 9/50* (2006.01)
*G06F 9/4401* (2018.01)
*G06F 1/3287* (2019.01)

(52) U.S. Cl.
CPC .......... *G06F 9/5094* (2013.01); *G06F 9/4403* (2013.01); *G06F 1/324* (2013.01); *G06F 1/3287* (2013.01)

(58) Field of Classification Search
CPC ...... G06F 9/5094; G06F 9/4403; G06F 1/324; G06F 1/3287
See application file for complete search history.

(56) References Cited

U.S. PATENT DOCUMENTS

| | | | |
|---|---|---|---|
| 5,634,014 A | 5/1997 | Gist et al. | |
| 2003/0206050 A1* | 11/2003 | Huard | G05F 1/46 327/540 |
| 2003/0212474 A1 | 11/2003 | Pippin | |
| 2005/0283561 A1* | 12/2005 | Lee | G06F 1/206 710/307 |
| 2006/0136763 A1* | 6/2006 | Jorgenson | G06F 1/3203 713/322 |
| 2006/0161375 A1* | 7/2006 | Duberstein | G06F 1/206 702/132 |
| 2008/0028236 A1* | 1/2008 | Capps | G06F 1/206 713/300 |
| 2008/0077282 A1 | 3/2008 | Hartman et al. | |

(Continued)

*Primary Examiner* — Gary Collins
(74) *Attorney, Agent, or Firm* — Volpe Koenig

(57) ABSTRACT

A method and apparatus for managing processor functionality includes receiving, by the processor, data relating to one or more environmental conditions. The processor compares the data to pre-existing parameters to determine whether or not the environmental conditions are within the pre-existing parameters for normal operation. If the data are within the pre-existing parameters for normal operation, the processor is operated in a normal operation mode. If the data are outside the pre-existing parameters for normal operation, the processor operates in a second operation mode which is dynamically determined and calibrated during power-on, boot and operation.

21 Claims, 2 Drawing Sheets

(56) References Cited

U.S. PATENT DOCUMENTS

| | | | |
|---|---|---|---|
| 2009/0150660 A1* | 6/2009 | Yao | G06F 1/3203 |
| | | | 713/2 |
| 2011/0131400 A1* | 6/2011 | Chiu | G06F 1/206 |
| | | | 713/2 |
| 2013/0007440 A1 | 1/2013 | Shah et al. | |
| 2013/0205130 A1* | 8/2013 | Hallowell | G06F 9/4401 |
| | | | 713/2 |
| 2014/0032949 A1* | 1/2014 | Kim | G05D 23/1919 |
| | | | 713/322 |
| 2014/0159806 A1* | 6/2014 | Kim | G05F 3/205 |
| | | | 327/537 |
| 2015/0063420 A1* | 3/2015 | Cho | G01K 7/01 |
| | | | 374/170 |
| 2018/0088638 A1* | 3/2018 | Nguyen | G06F 1/206 |
| 2018/0253317 A1* | 9/2018 | Pan | G06F 9/4401 |
| 2019/0204893 A1 | 7/2019 | Rotem et al. | |
| 2019/0369683 A1* | 12/2019 | Vishnubhatla | G06F 1/3296 |

\* cited by examiner

METHOD AND APPARATUS FOR MANAGING PROCESSOR FUNCTIONALITY

BACKGROUND

Central Processing Units (CPUs) are typically designed to work under certain environmental conditions, such as certain temperature, humidity, and air pressure, for example. However, if some of these conditions go beyond predefined limits, the CPU can fail to operate. If the CPU is unable to execute basic code and allow changes in BIOS, then the CPU will be nonoperational unless the environmental condition is altered to be within the typical limits.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for detecting environmental conditions and allowing for operation outside those conditions is described herein.

A method for managing processor functionality includes receiving, by the processor, data relating to one or more environmental conditions. The processor compares the data to pre-existing parameters to determine whether or not the environmental conditions are within the pre-existing parameters for normal operation. The processor is operated in a normal operation mode if the data are within the pre-existing parameters for normal operation, and in a second operation mode if the data are outside the pre-existing parameters for normal operation.

An apparatus for managing processor functionality includes at least one sensor, and a processor communicatively coupled to the at least one sensor. The sensor detects one or more environmental conditions and sends data regarding the one or more environmental conditions to the processor. The processor compares the data to pre-existing parameters to determine whether or not the environmental conditions are within the pre-existing parameters for normal operation. The processor operates in a normal operation mode if the data are within the pre-existing parameters for normal operation, and operates in a second operation mode if the data are outside the pre-existing parameters for normal operation.

A non-transitory computer-readable medium for managing processor functionality in a computer system has instructions recorded thereon, that when executed by the processor, cause the processor to perform operations. The operations include receiving, by the processor, data relating to one or more environmental conditions, comparing the data to pre-existing parameters to determine whether or not the environmental conditions are within the pre-existing parameters for normal operation, operating the processor in a normal operation mode if the data are within the pre-existing parameters for normal operation, and operating the processor in a second operation mode if the data are outside the pre-existing parameters for normal operation.

Figure 1:
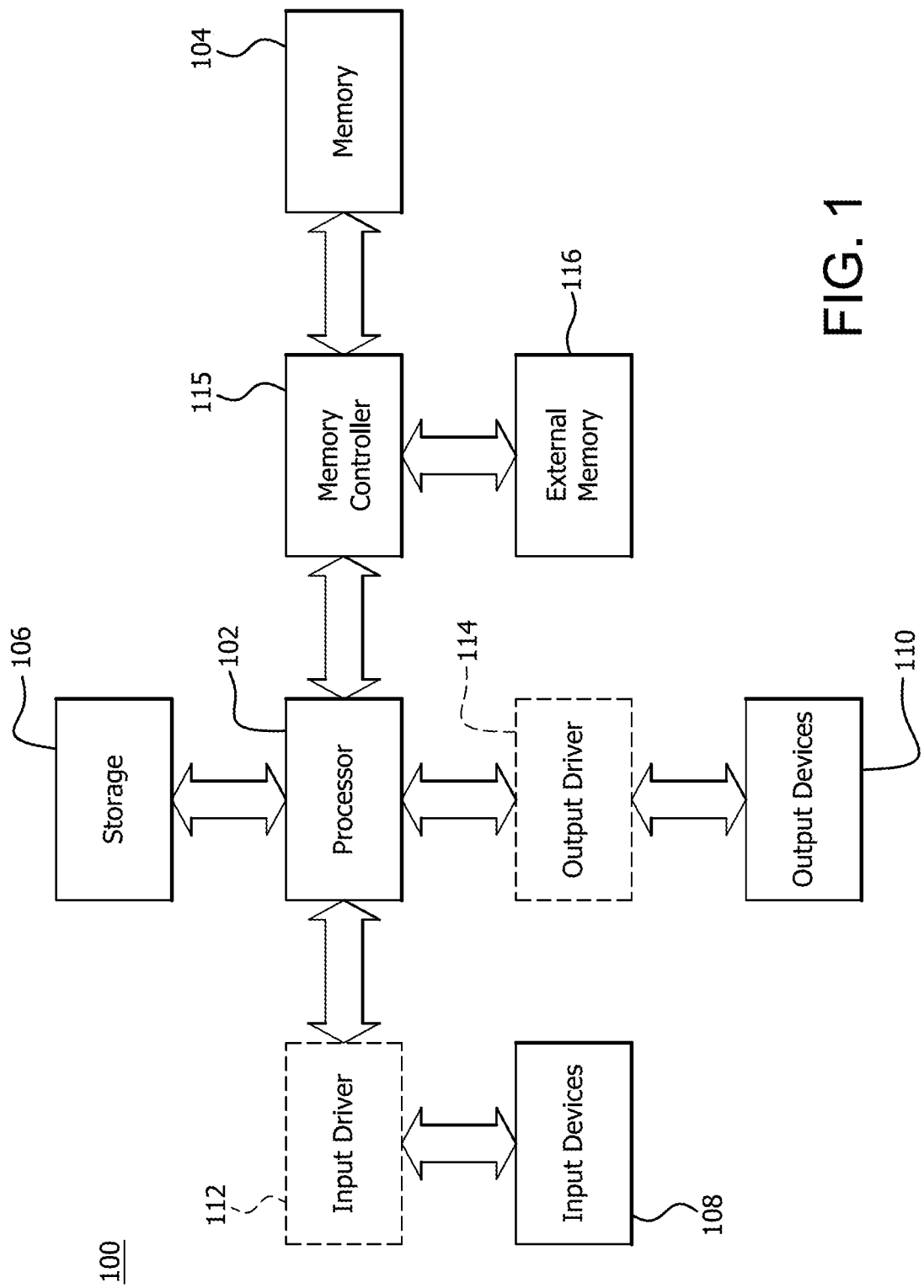
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
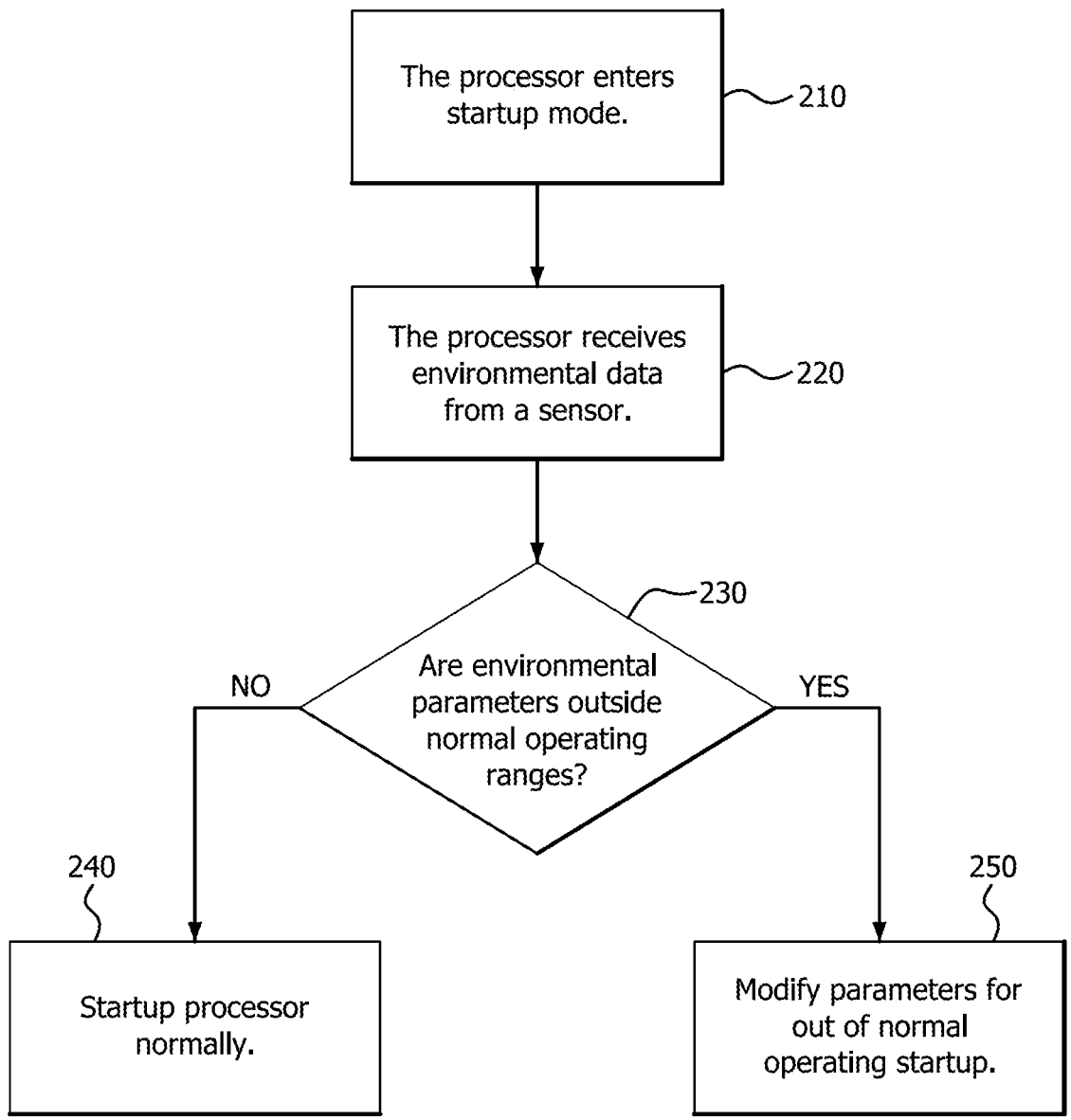
FIG. 2 is a flow diagram of an example method of managing processor functionality.

FIG. 2 is a flow diagram of an example method 200 for managing processor functionality. In step 210, the processor (e.g., processor 102 of FIG. 1) enters a startup mode. The processor receives data from one or more sensors regarding environmental conditions (step 220). For example, the processor 102 in system 100 may receive data from sensors such as input devices 108 via an input driver 112. The data may include temperature, humidity, and air pressure, for example.

Once the processor has acquired the environmental data, the data is compared to pre-existing parameters to determine if the environmental parameters are outside of the pre-existing parameters for normal operation (step 230). If the environmental data meets the parameters for normal operation (step 230), then the processor enters normal startup mode (step 240). For example, if the environmental temperature is within a threshold for normal operation, then when the processor receives the temperature data and compares it to the temperature parameter in the pre-existing parameters, it determines that a normal startup is possible and effects a normal startup.

If the environmental parameters are outside of the normal operating ranges (step 230), then the processor modifies the pre-existing parameters to continue out of normal operating startup (step 250). For example, if the temperature received from the sensor is outside the normal temperature operating range for normal startup, the processor starts up in an outside of normal startup condition. This may include operating at reduced voltages, frequencies, and/or operating at a reduced functional level (e.g., powering down one or more cores). The out of normal operation may also include modifying phase locked loop (PLL) settings to operate at reduced functionality, and input/output I/O terminations to operate at reduced functionality, for example.

In this manner, the processor can continue to operate across a broader set of environmental conditions that would not be possible with a static set of initial programming pre-existing parameters that do not take environmental conditions into consideration. Accordingly, the processor does not cease to operate on account of the environmental conditions being outside a normal operating condition as defined by the pre-existing parameters.

System components including but not limited to a main processor and/or a System Management Unit (SMU) and/or Platform Security Processor (PSP) and/or other state machines, embedded controllers, and logic (both hardware and software) may adjust their own local operating parameters and/or the operating parameters of any other components of the system, including third party devices. This may occur early in a powerup or reboot sequence and be continually monitored with further adjustments possible during operation as sensor read parameters change. Additionally, if deemed necessary from sensor feedback, certain features (hardware or software) or mechanisms can be disabled, enabled, or ignored. Additionally, telemetry or feedback from external/third party sensors, devices, and the like can be utilized by this mechanism (e.g., a motherboard may incorporate sensors, embedded controllers, specialized logic, for example, which may interface with the mechanism to influence or tune parameters making changes specialized to suit a particular design, such as unique memory or bus PCB trace design and layout choices).

As an example use case, many processors contain circuitry that is designed and tested to operate linearly across a set range of conditions. For instance a processor may be designed and tested to operate to temperature specifications of −40° C. to 85° C. and is well characterized to operate linearly for voltage and other settings across those temperature conditions. Lab testing outside of this designed-for range depicts what is required to maintain functionality at differing conditions outside of that range (e.g., a different and non-linear set of voltages, timings, and settings to ensure continuous operation for these conditions). In the field, conditions are monitored and the necessary settings for voltage, timings, and the like are continually adjusted such that as external temperature conditions change out of and back into the linear operating region, functionality is maintained.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for managing processor functionality, comprising:
   receiving, by the processor, data relating to one or more environmental conditions from one or more sensors communicatively coupled with the processor during operation of the processor, wherein the processor is operating in a first operation mode;
   comparing the data to pre-existing parameters to determine whether or not the environmental conditions are within the pre-existing parameters for the first operation mode;
   operating the processor in the first operation mode if the data are within the pre-existing parameters for the first operation mode; and
   operating the processor in a second operation mode that includes modifying the pre-existing parameters based on the received data from the one or more sensors, and operating the processor at a reduced voltage level than the first operation mode voltage level if the received data is outside the pre-existing parameters for the first operation mode.

2. The method of claim 1, wherein the environmental conditions include one or more of temperature, humidity, and air pressure conditions.

3. The method of claim 1, wherein the second operation mode includes operating the processor at a reduced frequency.

4. The method of claim 1, wherein the second operation mode includes the processor operating with reduced functionality.

5. The method of claim 4, wherein reduced functionality operation includes the processor powering down one or more cores.

6. The method of claim 1, wherein the second operation mode includes the processor modifying a phase lock loop (PLL) setting to operate at reduced functional levels.

7. The method of claim 1, wherein the second operation mode includes the processor modifying input/output I/O terminations to operate at reduced functional levels.

8. The method of claim 7, wherein the second operation mode includes disabling one or more I/O terminations.

9. The method of claim 1, further comprising receiving the data upon a powerup or bootup of the processor.

10. The method of claim 1, further comprising receiving the data dynamically upon a changing of the one or more environmental conditions during the operation of the processor.

11. An apparatus for managing processor functionality, comprising:
at least one sensor; and
a processor communicatively coupled to the at least one sensor,
wherein the at least one sensor detects one or more environmental conditions and sends data regarding the one or more environmental conditions to the processor operating in a first operation mode,
wherein the processor:
compares the received data to pre-existing parameters to determine whether or not the environmental conditions are within the pre-existing parameters for the first operation mode;
operates in the first operation mode if the received data is within the pre-existing parameters for the first operation mode; and
operates in a second operation mode that includes modifying the pre-existing parameters based on the received data from the at least one sensor, and operates the processor at a reduced voltage level than the first operation mode voltage level if the received data is outside the pre-existing parameters for the first operation mode.

12. The apparatus of claim 11, wherein the environmental conditions include one or more of temperature, humidity, and air pressure conditions.

13. The apparatus of claim 11, wherein the second operation mode includes operating the processor at a reduced frequency.

14. The apparatus of claim 11, wherein the second operation mode includes the processor operating with reduced functionality.

15. The apparatus of claim 14, wherein reduced functionality operation includes the processor powering down one or more cores.

16. The apparatus of claim 11, wherein the second operation mode includes the processor modifying a phase lock loop (PLL) setting to operate at reduced functional levels.

17. The apparatus of claim 11, wherein the second operation mode includes the processor modifying input/output I/O terminations to operate at reduced functional levels.

18. The apparatus of claim 17, wherein the second operation mode includes the processor disabling one or more I/O terminations.

19. The apparatus of claim 11, wherein the processor receives the data upon a powerup or bootup of the processor.

20. The apparatus of claim 11, wherein the processor dynamically receives the data upon a changing of the one or more environmental conditions during operation of the processor.

21. A non-transitory computer-readable medium for managing processor functionality in a computer system, the non-transitory computer-readable medium having instructions recorded thereon, that when executed by the processor, cause the processor to perform operations including:
receiving, by the processor, data relating to one or more environmental conditions from one or more sensors communicatively coupled with the processor during operation of the processor, wherein the processor is operating in a first operation mode;
comparing the data to pre-existing parameters to determine whether or not the environmental conditions are within the pre-existing parameters for the first operation mode;
operating the processor in the first operation mode if the data are within the pre-existing parameters for the first operation mode; and
operating the processor in a second operation mode that includes modifying the pre-existing parameters based on the received data from the one or more sensors, and operating the processor at a reduced voltage level than the first operation mode voltage level if the received data is outside the pre-existing parameters for the first operation mode.

* * * * *